United States Patent
Cox

(10) Patent No.: US 7,610,589 B2
(45) Date of Patent: Oct. 27, 2009

(54) USING HELPER DRIVERS TO BUILD A STACK OF DEVICE OBJECTS

(75) Inventor: David P Cox, Santa Barbara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 10/645,501

(22) Filed: Aug. 22, 2003

(65) Prior Publication Data

US 2005/0044555 A1    Feb. 24, 2005

(51) Int. Cl.
*G06F 9/44* (2006.01)
*G06F 9/445* (2006.01)

(52) U.S. Cl. .................. 719/321; 719/327

(58) Field of Classification Search ........... 719/321, 719/327
See application file for complete search history.

(56) References Cited

U.S. PATENT DOCUMENTS

| | | | | |
|---|---|---|---|---|
| 5,604,843 A | * | 2/1997 | Shaw et al. ................. 358/1.1 |
| 5,675,781 A | * | 10/1997 | Duncan et al. ................. 707/8 |
| 6,230,118 B1 | * | 5/2001 | Bader et al. .................... 703/24 |
| 6,233,624 B1 | * | 5/2001 | Hyder et al. ................. 719/327 |
| 6,832,379 B1 | * | 12/2004 | Zeryck et al. ................ 719/327 |
| 7,093,265 B1 | * | 8/2006 | Jantz et al. .................... 719/321 |
| 7,222,348 B1 | * | 5/2007 | Athreya et al. .............. 719/321 |
| 2003/0140095 A1 | * | 7/2003 | Simpson et al. ............. 709/203 |
| 2004/0230988 A1 | * | 11/2004 | Stokes et al. ................. 719/321 |

\* cited by examiner

*Primary Examiner*—Li B Zhen

(57) ABSTRACT

A method, used while building in processor memory a stack of device objects (DOs) representing a device, there being a multi-role driver for a plurality of roles at least one of which corresponds to the device, may include: registering a plurality of helper drivers so as to uniquely correspond to the plurality of roles, respectively, each helper driver mapping uniquely to one of the multiple roles of the multi-role driver, respectively; and indirectly specifying a corresponding one of the multiple roles of the multi-role driver by specifying the helper driver mapped thereto. A related apparatus and machine-readable medium bearing machine-readable instructions may include features similar to elements of the method.

18 Claims, 5 Drawing Sheets

USING HELPER DRIVERS TO BUILD A STACK OF DEVICE OBJECTS

BACKGROUND OF THE INVENTION

The WINDOWS driver model (WDM) is a driver technology developed by the MICROSOFT Corporation that supports drivers which are compatible with WINDOWS 98, 2000, ME, XP and WINDOWS SERVER 2003. The WDM is a superset of the WINDOWS NT driver model (NTDM).

In a layered software architecture such as the WDM or NTDM, part of a communications path between a device/logical-unit (LUN) and an input/output (I/O) initiator (e.g., an application on a host connected to the device/LUN via a bus) is a stack of data structures, which in the WINDOWS environment are referred to as device objects (DOs). At initialization (in the WINDOWS environment), the plug-and-play (PnP) manager orchestrates the assembly of (also known as adding drivers to) a stack of drivers that together handle the I/O for a device by successively invoking drivers registered (in the registry of the host) to the type of device, where each driver successively creates then attaches a DO to the top of the stack.

Most drivers are uni-role drivers designed and registered for only one role, i.e., they are invoked to add a DO for only one role. It is noted that a role is a combination of the type of device for which the driver is invoked and the extent of the stack at the point at which the driver is invoked. A driver's function as it relates to the device is implied by the location in the stack of the device object. Different DOs within stack may: handle different aspects of a device's function; provide higher-level conceptual capabilities based on a device's low-level functions; and/or modify information passed between other layers for purposes of modifying or enhancing their behavior.

Unlike uni-role drivers, a multi-role driver is designed and registered for multiple roles. It is to be noted that multi-role drivers are not contemplated by the WDM. When the PnP manager invokes the multi-role driver, no information is conveyed to the multi-role driver as to the role for which it is being invoked. This is because the WDM contemplates only uni-role drivers, i.e., that a driver is invoked only for one role.

The Background Art compensates by providing the multi-role driver with role-discovery code, such as in the system 100 shown in the software block diagram of Background Art FIG. 1. In the system 100, the PnP manager 102 invokes a multi-role driver 104, thereby invoking an AddDevice routine 106 within the multi-role driver 104. Invoking the routine 106 includes passing to it a physical device object (PDO), e.g., A (item 108), as indicated by the arrow 120. Similarly, additional cases of the PnP manager 102 invoking the routine 106 are shown, which includes passing along the PDO B in two different instances (arrows 122 and 124), as well as passing PDO C (arrow 126).

A function is a part of a larger program, e.g., a driver. A function carries out one or more operations which represent a subset of the operations that may be carried by the program of which the function is a part. A routine is a function whose behavior (parameters, return value, intent) is specified by the WDM driver development kit (DDK). An example of a DDK-specified routine is the AddDevice routine.

The AddDevice routine 106 includes a plurality of DOPush functions, each of which generates a DO and adds it to the stack whose base is the PDO. Each of the DOPush functions is specific to a particular role. For the purposes of discussion, it is assumed that the multi-role driver 104 is registered for four roles. Accordingly, the AddDevice routine 106 includes a role(A)-specific DOPush function 112, a role(B1)-specific DOPush function 114, a role(B2)-specific DOPush function 116 and a role(C)-specific DOPush function 118.

In operation, the role-discovery code 110, reacts to receiving a PDO by examining the characteristics of the PDO and (optionally) the extent of the stack to verify that they conform to what the AddDevice routine 206 has been designed to expect. Examining the characteristics of the PDO includes discovering the type of the device which the PDO represents. Examining the extent of the stack includes discovering the point in the build-up of the stack at which the DO is supposedly to be attached by the AddDevice routine 206.

Based upon the discovery of the device type and the extent of the stack, and other characteristics and/or behaviors, the code 110 determines the role for which the AddDevice routine 206 is being invoked. Upon determining the role, the role-discovery code 110 can selectively invoke the corresponding role-specific DOPush function 112, 114, 116 or 118, which includes passing the PDO to the DOPush function.

SUMMARY OF THE INVENTION

One of the embodiments of the invention is directed to a method, used while building in processor memory a stack of device objects (DOs) representing a device, there being a multi-role driver for a plurality of roles at least one of which corresponds to the device. Such a method may include: registering a plurality of helper drivers so as to uniquely correspond to the plurality of roles, respectively, each helper driver mapping uniquely to one of the multiple roles of the multi-role driver, respectively; and indirectly specifying a corresponding one of the multiple roles of the multi-role driver by specifying the helper driver mapped thereto.

Another of the embodiments of the invention is directed to a code arrangement on a machine-readable medium execution of which facilitates assembling in processor memory a stack of device objects (DOs) representing a device. Such a machine-readable code arrangement may include: a multi-role driver code portion which corresponds to the device, the multi-role driver having exported functions corresponding to the multiple roles of the multi-role driver, respectively; a plurality of helper driver code portions; and an installer code portion for registering the plurality of helper driver code portions so as to uniquely map to the multiple roles, respectively; each helper driver code portion being operable to receive a corresponding PDO and pass the PDO to the multi-role driver without attempting to attach to the stack a DO corresponding to the helper driver code portion.

Another of the embodiments of the invention is directed to an apparatus having memory in which is buildable a stack of device objects (DOs) representing a device attached to the apparatus. Such an apparatus may include: multi-role driver means for operating according to a plurality of roles; a plurality of helper driver means registered so as to uniquely correspond to the plurality of roles, respectively, of the multi-role driver; and means for selectively invoking the multi-role driver according to one of the multiple roles via invoking the corresponding helper driver mapped thereto.

Additional features and advantages of the invention will be more fully apparent from the following detailed description of example embodiments and the accompanying drawings.

The remaining drawings are: intended to depict example embodiments of the invention and should not be interpreted to limit the scope thereof.

Figure 1:
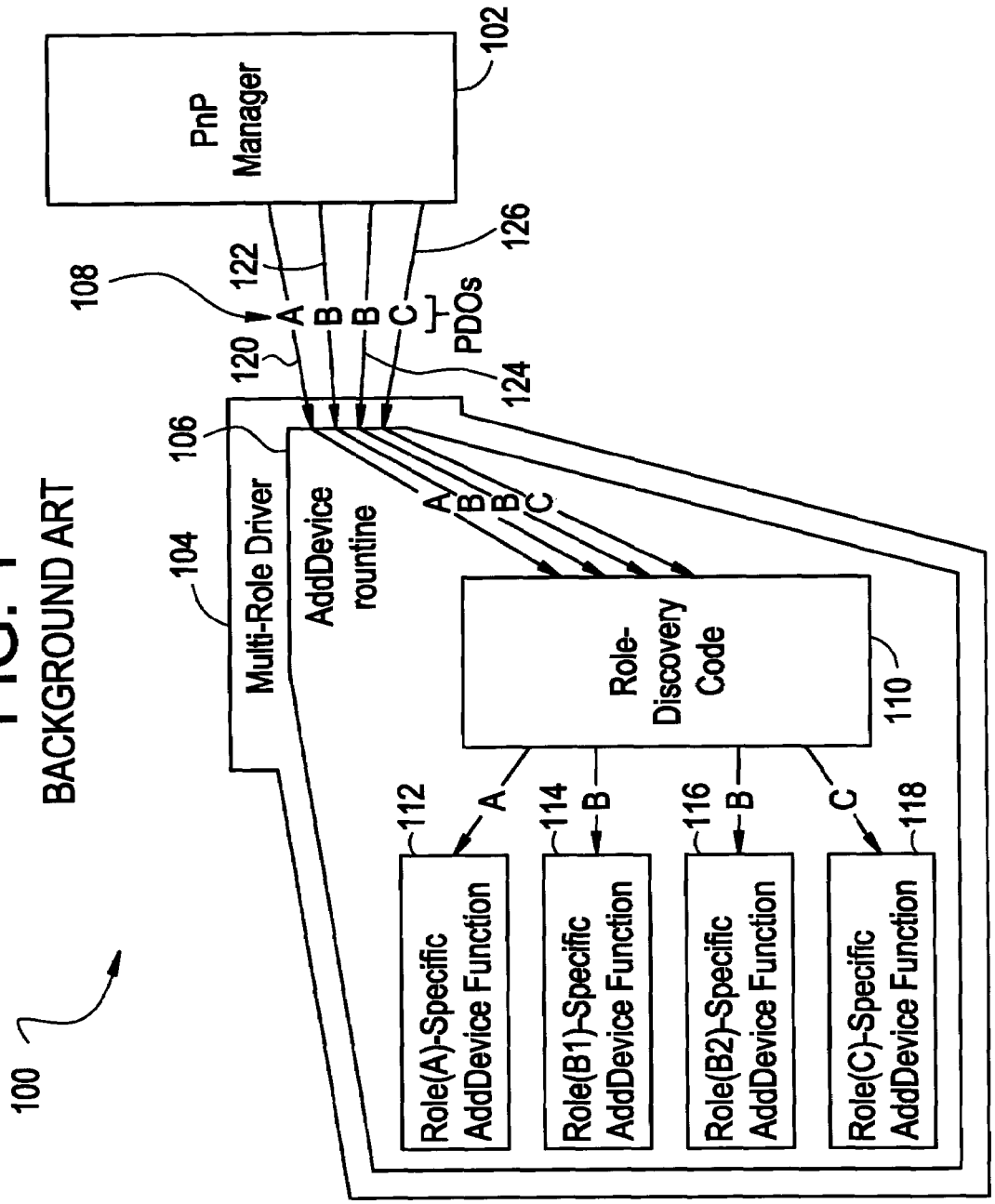
FIG. 1 is a software block diagram according to the Background Art.
Figure 2:
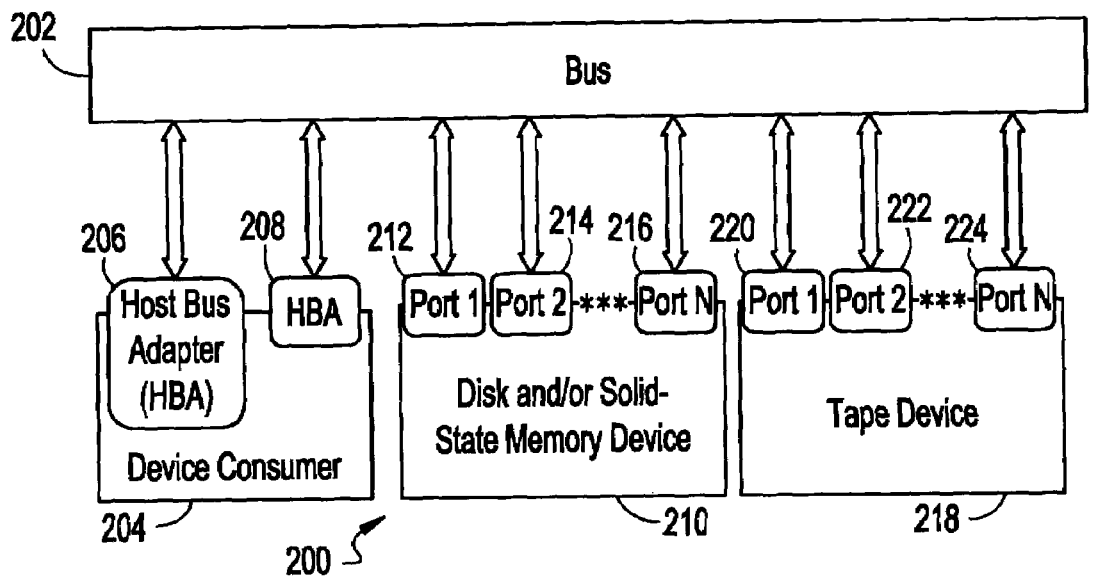

FIG. 2 is a hardware block diagram according to an embodiment of the invention.

Figure 3:
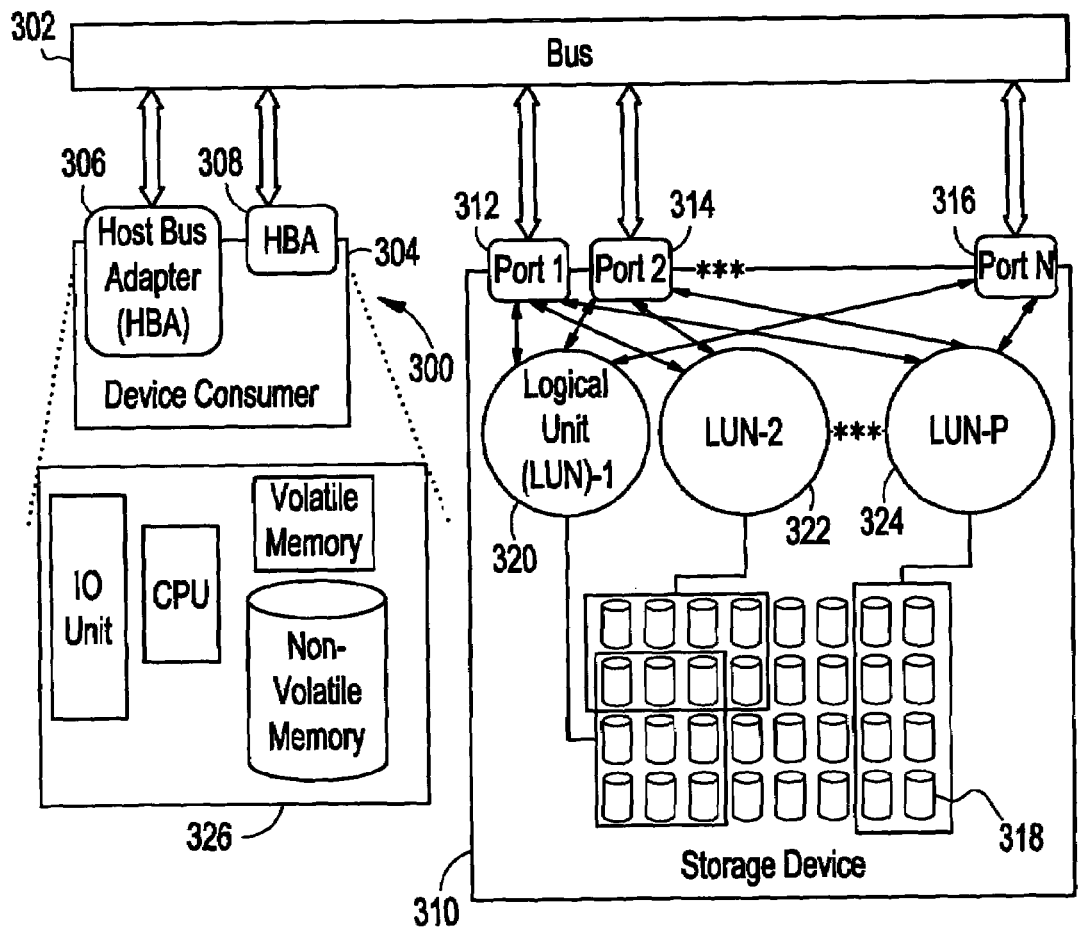

FIG. 3 is a hardware block diagram according to an embodiment of the invention.

Figure 4:
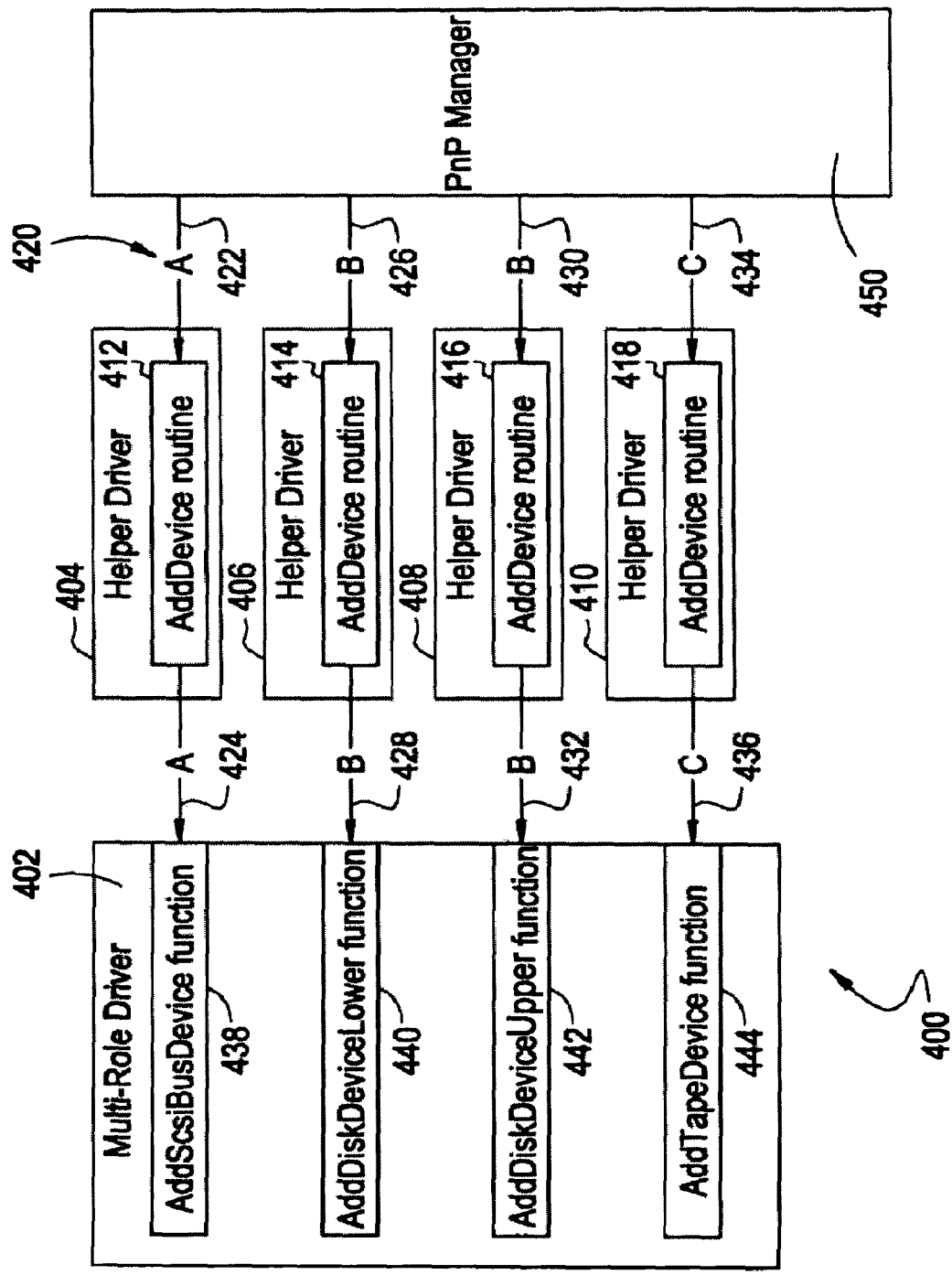

FIG. 4 is a software block diagram according to an embodiment of the invention.

Figure 5:
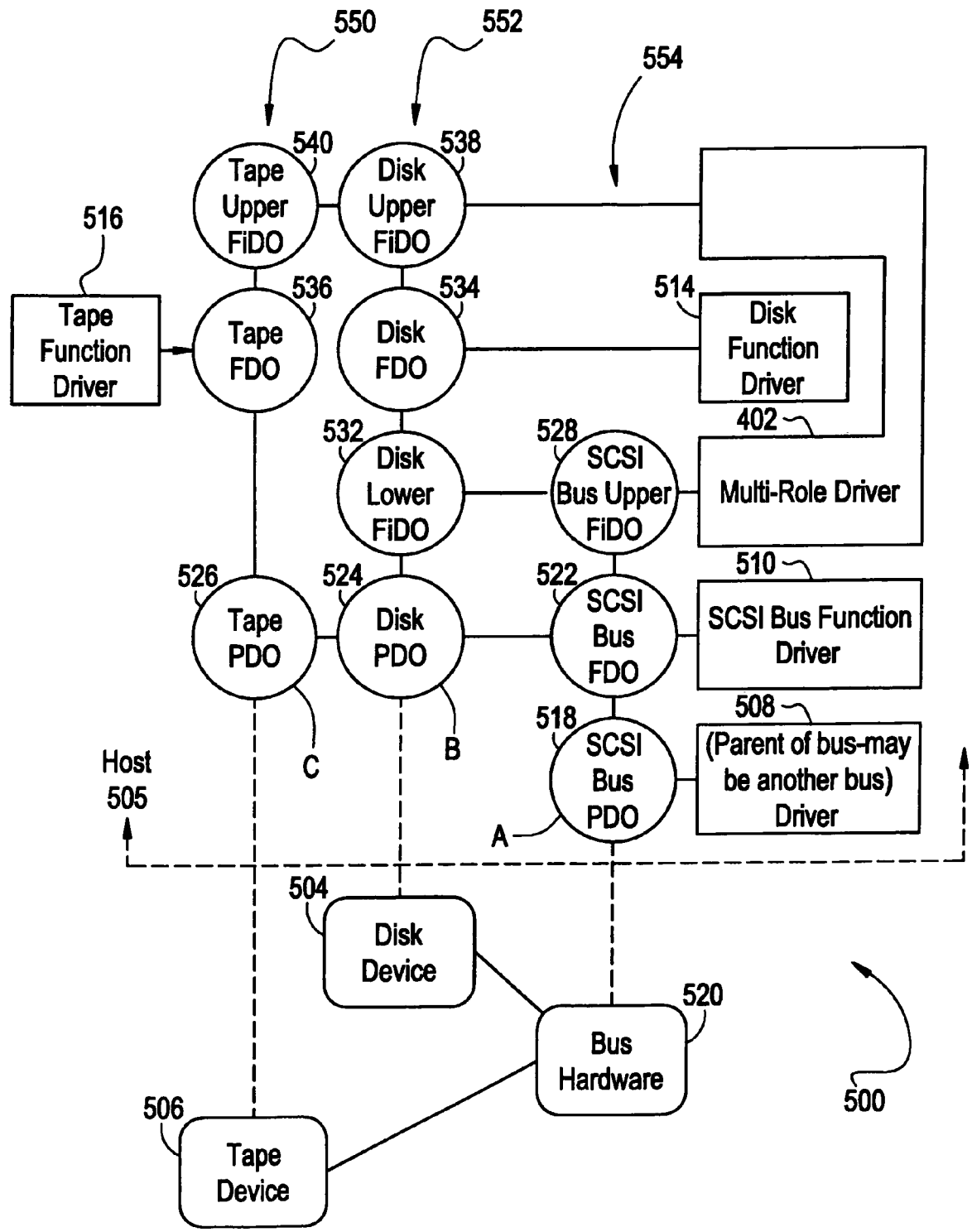

FIG. 5 is a software block diagram of example WDM stacks the building of which are done according to an embodiment of the invention.

Figure 6:
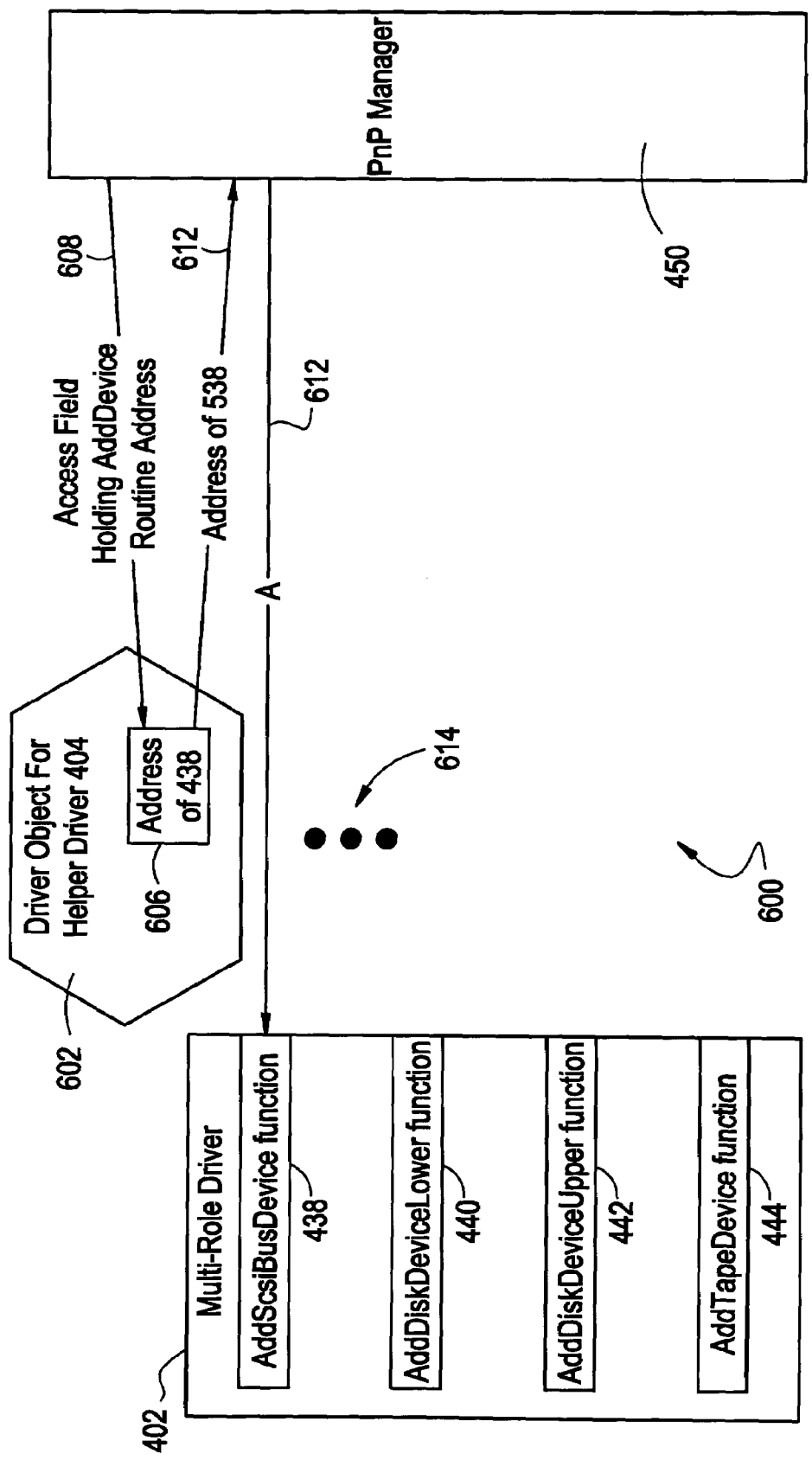

And FIG. 6 is a software block diagram according to another embodiment of the invention.

DETAILED DESCRIPTION OF EXAMPLE EMBODIMENTS

An embodiment of the invention, at least in part, is the recognition of the following. The need for the Background Art multi-role driver to determine the role for which it is being invoked, i.e., the need for it to include role-discovery code, significantly increases the complexity and size of the code representing the Background Art multi-role driver. If the need for role-discovery can be eliminated, the complexity and size of the code representing a multi-role driver can be significantly simplified and correspondingly reduced in size. Such a simplification could also cause initialization to be accomplished faster. Accordingly, this embodiment of the invention provides a multi-role driver that does not need role-discovery code, and which (among other things) can be realized with a smaller amount of code and can achieve faster initialization.

Some examples of devices for which stack-building is facilitated according to embodiments of the invention are depicted in FIGS. 2-3. Such stack-building is facilitated by using multi-role driver architectures according to embodiments of the invention, such as are depicted in FIGS. 4 and 6.

FIG. 2 depicts a hardware block diagram of a system 200 according to an embodiment of the invention that incorporates software according to an embodiment of the invention. The system 200 includes a bus (e.g., SCSI, Ethernet (iSCSI/IP/Gbit Ethernet), fibre channel, etc.) 202 to which is connected a host, which can be described as consumer of device services (hereafter a device consumer) 204, a device 210 (e.g., a disk-based storage device and/or a solid-state-based memory device) and a device 218 (e.g., a tape-based device). Stacks representing the devices 210 and 218 would be built-up in the memory (not shown) of the device consumer 204. It is noted that HBAs 206 and 208 are additional devices for which stacks would be built in the memory of the device consumer 204.

FIG. 3 depicts a hardware block diagram corresponding to a particular type of system 200, namely a storage area system or storage area network (SAN) 300. The SAN 300 includes a bus 302, a device consumer 304 and a non-volatile storage device 310. The device consumer 304 can include HBAs 306 and 308. Fewer or greater numbers of HBAs 306/308 can be provided depending upon the circumstances of a situation.

The device consumer 304 can take the form of a computer 326 including at least a CPU, input device(s), output device(s) and memory. For example, the computer 326 has been depicted as including a CPU, an IO unit, volatile memory such as RAM and non-volatile memory such as ROM, flash memory, disk drives and/or tape drives.

The storage device 310 includes port 1 (312), port 2 (314), ... port N (316) and logical units (LUNs) 1, 2, ... P. A LUN can represent a type of massive non-volatile storage, configuration functionality, monitoring functionality and/or mechanical functionality (such as tape changing), etc. Also included in the storage device 310 are non-volatile memories 318 such as disk drives, tape drives and/or solid-state memory.

More generally, embodiments of the invention can apply to any system having a host and a device connected together by a bus. Examples of such systems are depicted in FIGS. 2 and 3, discussed above.

FIG. 4 is a software block diagram of a stack-building architecture 400 according to an embodiment of the invention. The architecture 400 includes a multi-role driver 402, a PnP manager 450 and a plurality of helper drivers 404-410. An example block diagram of WDM-compliant stacks which were assembled, in part, by the multi-role driver 402 is depicted in FIG. 5 (to be discussed below).

To simplify explanation, it will be assumed that the multi-role driver 402 is loaded on a host 505 (see FIG. 5) such as the device consumer 204 or 304, and that the host 505 is connected to a bus 502 (see FIG. 5) to which are connected service-providing disk device 504 (see FIG. 5) and tape device 506 (see FIG. 5). Accordingly, the multi-role driver 402 is shown as having 4 DOPush functions 438-444 for the four roles it is shown as having in FIG. 5 (to be discussed further below).

For brevity, in FIG. 5 only two service-providing devices (504 and 506) are depicted; it should be understood that many more can be present. Moreover, the service-providing devices connected to the bus 502 can be of any type. To enhance understanding of the multi-role driver 402, some uni-role drivers are also depicted in FIG. 5, namely a bus driver 508 (which in some cases can be the PnP manager 450), the SCSI bus function driver 510, the disk function driver 514 and the tape function driver 516.

For the example of FIG. 5, the four roles of the multi-role driver 402 are assumed to be: upper filter driver for the SCSI bus 502; lower filter driver for the disk device 504; upper filter driver for the disk 504; and upper filter driver for the tape device 506. It is to be understood that the number of, and particular nature of, the roles illustrated in FIGS. 4-5, as well as each of these roles generally being a filter, are not limitations, rather, multi-role drivers according to embodiments of the invention can also be of any other nature, e.g., a function driver, and can take on any number of roles Q, where Q is an integer and $Q \geq 2$.

Also, because four roles are assumed for the multi-role driver 402, four corresponding helper drivers 404-410 are shown. But just as any number Q of roles can be handled by the multi-role driver (meaning any number of DOPush functions can be included), embodiments of the invention can provide a corresponding number Q of helper drivers.

In FIG. 5, the bus stack 554, the disk stack 552 and the tape stack 550 are depicted as already having been built. At various points during the building up of the stacks 550-554, the multi-role driver 402 attached: a SCSI Bus upper FiDO 528 to the bus stack 554; a tape upper FiDO 540 in the tape stack 550; a disk lower FiDO 532 in the disk stack 552; and a disk upper FiDO 538 in the disk stack 552.

In keeping with the example set out in FIG. 5, it is assumed that the multi-role driver 402 has four DOPush functions 438-444 that handle the four roles assumed for the multi-role driver 402. Accordingly, DOPush function 438 (referred to as the AddSCSIBusDevice function) can create and add the SCSI bus upper FiDO 528 to the bus stack 554; DOPush function 440 (referred to as the AddDiskDeviceLower function) can create and add the disk lower FiDO 532 to the disk stack 552; DOPush function 442 (referred to as the AddDiskDeviceUpper function) can create and add the disk upper FiDO 538 to the disk stack 552; and DOPush 444 (referred to as the AddTapeDevice function) can create and add the tape upper FiDO 540 to the tape stack 550.

The DOPush functions 438-444 can be similar to DOPush functions according to the Background Art but for at least the following significant difference. Unlike the DOPush functions according to the Background Art, the DOPush functions 538-544 are exported, i.e., they are made available to be invoked by a code portion external to the multi-role driver 402.

In terms of the example of FIG. 5 (where the multi-role driver 402 is assumed to have four roles), FIG. 4 includes helper drivers 404, 406, 408 and 410. Each of the helper drivers 404-410 is registered (in the registry (not depicted) of the host 505) uniquely to one of the roles provided by the multi-role driver 402. Accordingly, the helper driver 404 is registered as an upper filter driver for the bus 502, the helper driver 406 is registered as a lower filter driver for the disk device 504, the helper driver 408 is registered as an upper filter driver for the disk device 504 and the helper driver 410 is registered as an upper filter driver for the tape device 506.

A uni-role or a multi-role driver is provided with corresponding installer code that writes the driver to the hard-disk and sets values in the keys (folders) within the registry to, in effect, register the driver as corresponding to a role. The installer code for multi-role driver according to embodiments of the invention registers each of the helper drivers to its corresponding role, as opposed to the Background Art in which the multi-role driver itself is registered to each of the roles. While the helper drivers 404-410 are registered in the registry, it should be understood that the multi-role driver 402 is not registered in the registry for any of these roles.

The helper drivers 404-410 include dynamic link import information relating to their use of the DOPush functions (which can be referred to as DOPush-use information), i.e., information that indicates they need access to the exported functions of the multi-role driver. The DOPush-use information is in a standardized format used in dynamic linking. When the helper drivers are loaded (because they are registered), the loader portion of the operating system (OS) sees that the helper drivers have dynamic link import information and consequently loads the multi-role driver 402 (because the multi-role driver 402 has the corresponding exported DOPush functions 438-444) by way of standard dynamic linking support in the operating system.

Another approach to loading the multi-role driver 402 is to register it for unconditional early (UE) loading during OS boot. This is a retained, pre-PnP feature of Windows NT, etc. for loading drivers, and serves to load them whether or not they are involved in any stacks whose assembly is orchestrated by the PnP manager 450. This would not cause any DOPush function to be invoked at the time the multi-role driver 402 is UE-loaded, because UE-loading is not initiated by the need to build a stack for a particular device. UE-loading does not prevent the AddDevice and/or exported functions of a UE-loaded driver from being invoked later.

In general, when a driver is loaded, a corresponding driver object is created in memory of the host.

In terms of behavior, each of the helper drivers 404-410 does not behave in the same manner as a typical driver, e.g., because none of the helper drivers 404-410 attempts to create and attach a device object to the respective stack. Rather, the role of each of the helper drivers is to invoke the corresponding DOPush function within the multi-role driver 402.

As such, when the PnP manager 450 determines from the registry that a helper driver, e.g., 404, should be invoked, the PnP manager 450 references the driver object (not depicted) for the helper driver 404 to obtain the address of the AddDevice routine 412 of the helper driver 404. Then the PnP manager 450 invokes the AddDevice routine 412, which includes passing the PDO (A, as indicated by item 420) for the bus 502 (see FIG. 5) to the AddDevice routine 412, as indicated by arrow 422.

The AddDevice routine 412 of the helper driver 404 then invokes the AddSCSIBusDevice function 438, which includes passing the PDO (A), as indicated by arrow 424. Again, though the AddDevice routine 412 is external to multi-role driver 402, it can invoke the AddScsiBusDevice function 438 because the function 438 has been exported for dynamic linking. In response, the AddSCSIBusDevice function 438 creates (not shown) and attaches (not shown) the SCSI bus upper filter FiDO 528 to the bus stack 554.

Similarly, when the PnP manager invokes the helper device driver 406, it specifically invokes the AddDevice routine 414 of the helper driver 406, which includes passing the PDO (B) for the disk device 504 (see FIG. 5), as indicated by arrow 426. In response, the AddDevice routine 414 invokes the AddDiskDeviceLower function 440, which includes passing the PDO (B), as indicated by arrow 428. And, correspondingly, the AddDiskDeviceLower function 440 creates (not shown) and attaches (not shown) the disk lower FiDO 532 to the disk stack 552. Also, when the PnP manager 450 invokes the helper driver 408, it locates and invokes the AddDevice routine 416, which includes passing the PDO (B), as indicated by arrow 430. The AddDevice routine 416 invokes the AddDiskDeviceUpper function 442 (as indicated by arrow 432), which includes passing the PDO (B), as indicated by arrow 432, in response to which the AddDiskDeviceUpper function 442 creates (not shown) and attaches (not shown) the disk upper FiDO 538 to the disk stack 552.

Tape upper FiDO 540 in the tape device stack 550 is created (not shown) and attached (not shown) by the AddTapeDevice function 444 in response to the AddTapeDevice function 444 being invoked (as indicated by arrow 436) by the AddDevice routine 418, which included passing the PDO (C) for the tape device 506 (see FIG. 5). The AddDevice routine 418 is, in effect, invoked (as indicated by arrow 434) when the helper device 410 is invoked by PnP manager 450, which included passing the PDO (C).

As an alternative embodiment of the invention, rather than providing each helper driver 404-410 with an AddDevice routine, instead the field in the driver object (again, not depicted in FIG. 4, but see FIG. 6, discussed below) that would otherwise contain the address of the AddDevice routine can be configured to contain the address of the corresponding DOPush function 438-444, respectively, within the multi-role driver 402. In other words, data in the driver object of the helper driver 404 can direct the PnP Manager 450 to invoke directly to the AddSCSIBusDevice function 438. Similarly, the driver object (not depicted) of the helper driver 406 can contain a field having the address of the AddDiskDeviceLower function 440, the driver object (not depicted) of the helper driver 408 can contain a field identifying the address of the AddDiskDeviceUpper function 442 and the driver object (not depicted) of the helper driver 410 can include a field that identifies the address of the AddTapeDevice function 444.

FIG. 6 is a software block diagram of this alternative stack-building architecture 600 according to an embodiment of the invention. The architecture 600 includes the multi-role driver 402 and the PnP manager 450 as in FIG. 4. Also included in the architecture 600 is a driver object 602 representing the helper driver 404 (not depicted in FIG. 6). The driver object 602 includes a field 606 holding the address of the corresponding DOPush function, namely AddSCSIBusDevice function 438.

In FIG. 6, the PnP manager 450 invokes the helper driver 404 which, in effect, is understood as the PnP manager 450 accessing the field 606 (in the driver object 602) that otherwise typically would include the address of the AddDevice routine for the driver 404. But instead, the field 606 includes the address of the corresponding DOPush function, namely AddSCSIBusDevice function 438. So, the PnP manager 450 accesses (as indicated by arrow 608) the field 606 in the driver object 602 and reads (as indicated by arrow 610) the address that it contains. Then, the PnP manager 450 directly invokes the AddSCSIBusDevice function 438, which includes passing the PDO (A), as indicated by arrow 612. In other words, the PnP manager 450 follows a succession of pointers (and/or references) until it reaches the address of the AddSCSIBusDevice function 438, which the PnP manager 450 then invokes. In response, the AddSCSIBusDevice function 438 can create and attach the SCSI bus upper FiDO 528 to the bus stack 554.

For simplicity, only the driver object 602, etc. for the helper driver 404 has been depicted in FIG. 6. Similar driver objects, etc. would be provided for the other helper drivers 406, 408 and 410, as indicated by the ellipsis 614. An advantage of the embodiment of FIG. 6 is that the need for the AddDevice routines 404-410 is eliminated relative to FIG. 4.

The role, for which each helper driver 404-410 is invoked, is inherent to the driver itself. In other words, because each of the helper drivers 404-410 is registered only for one role, then its role is known by virtue of it being invoked by the PnP manager 450. As such, the presence of the helper drivers 404-410 eliminates the need for the role-discovery code 110 of the Background Art.

The helper drivers 404-410 differ from drivers according to the Background Art for a variety of reasons which include: the helper drivers 404-410 do not attempt to create a DO in response to receiving a PDO; and each helper driver 404-410 passes a PDO along to another driver-type piece of code, e.g., the corresponding DOPush function within the multi-role driver 402, or a component of the kernel, which contrasts with drivers according to the Background Art that do not pass a received PDO along to another driver or kernel component. Correspondingly, a difference of the multi-role driver 402 relative to Background Art drivers is that it is not registered in the registry for specific roles in the assembly of a stack representing a device. And a difference regarding the AddDevice functions 438-440 relative to the Background Art AddDevice functions is that they are exported beyond the multi-role driver 402 in the dynamic-link sense so they may be invoked by other drivers.

The invention being thus described, it will be obvious that the same may be varied in many ways. Such variations are not to be regarded as a departure from the spirit and scope of the invention, and all such modifications are intended to be included within the scope of the present invention.

We claim:

1. A method used while building in processor memory a stack of device objects (DOs) representing a device, there being a multi-role driver for a plurality of roles at least one of which corresponds to the device, the method comprising:

registering a plurality of uni-role helper drivers so as to uniquely correspond to the plurality of roles, respectively, each helper driver mapping uniquely to one of the multiple roles of the multi-role driver, respectively; and indirectly specifying a corresponding one of the multiple roles of the multi-role driver by specifying the helper driver mapped thereto, wherein each of the multiple roles in the multi-role driver has a corresponding DOPush function, each DOPush function having been made available to be invoked by a code portion external to the multi-role driver.

2. The method of claim 1, wherein the multi-role driver and the helper drivers are operable to run in the WINDOWS Driver Model environment.

3. The method of claim 1, wherein a role is determined according to a device type for which the multi-role driver is invoked and the extent of the stack at the point at which the multi-role driver is invoked.

4. The method of claim 1, wherein each helper driver includes an AddDevice routine that invokes a corresponding DOPush function in the multi-role driver, or each helper driver points to the address of the corresponding DOPush function in the multi-role driver.

5. A method used while assembling in processor memory a stack of device objects (DOs) representing a device, there being a multi-role driver for a plurality of roles at least one of which corresponds to the device, the device having a corresponding physical device object (PDO), the method comprising:

providing a plurality of DOPush functions in a multi-role driver;

loading the multi-role driver into the memory so as to arrange for each of the DOPush functions to be directly invokable by a code portion external to the multi-role driver; and invoking, externally to the multi-role driver, one of the DOPush functions, which includes passing the PDO of the device to the invoked DOPush function, wherein the DOPush function is invoked externally by an AddDevice routine of a helper driver, or the PnP manager, if the helper driver does not have the AddDevice routine, after the PnP manager is pointed to the address of the DOPush function by the helper driver, the helper driver being registered uniquely for the role to which the DOPush function corresponds.

6. The method of claim 5, wherein the multi-role driver is operable to run in the WINDOWS Driver Model environment.

7. The method of claim 5, further comprising: registering neither the multi-role driver nor the DOPush functions in the registry of the operating system as having a role in assembly of a stack representing a device.

8. The method of claim 5, wherein a role is determined according to a device type for which the multi-role driver is invoked and the extent of the stack at the point at which the multi-role driver is invoked.

9. A code arrangement on a machine-readable storage medium execution of which facilitates assembling in processor memory a stack of device objects (DOs) representing a device, the machine-readable code arrangement comprising:

a multi-role driver code portion which corresponds to the device, the multi-role driver code portion having exported functions corresponding to the multiple roles of the multi-role driver code portion, respectively;

a plurality of helper driver code portions; and an installer code portion for registering the plurality of helper driver code portions so as to uniquely map to the multiple roles, respectively;

each helper driver code portion being operable to receive a corresponding PDO and pass the PDO to the multi-role driver code portion without attempting to attach to the stack a DO corresponding to the help driver code portion, wherein the exported functions are DOPush functions and wherein each helper driver code portion includes an AddDevice routine code portion that invokes the corresponding DOPush function in the multi-role driver portion, or each helper driver code portion is operable to point to the address of the corresponding DOPush function in the multi-role driver code portion.

10. The machine-readable code arrangement of claim 9, wherein the multi-driver code portion and the helper driver code portions are operable to run in the WINDOWS Driver Model environment.

11. The machine-readable code arrangement of claim 9, wherein a role is determined according to a device type for which the multi-role driver code portion is invoked and the extent of the stack at the point at which the multi-role driver code portion is invoked.

12. An apparatus having memory in which is buildable a stack of device objects (DOs) representing a device attached to the apparatus, the apparatus comprising:

multi-role driver means for operating according to a plurality of roles;

a plurality of helper driver means registered so as to uniquely correspond to the plurality of roles, respectively, of the multi-role driver; and means for selectively invoking the multi-role driver according to one of the multiple roles via invoking the corresponding helper driver mapped thereto, wherein the multi-role driver means provides a plurality of DOPush functions corresponding to the multiple roles, respectively, each DOPush function having been made available to be invoked by a code portion external to the multi-role driver means.

13. The apparatus of claim 12, wherein the multi-role driver means and the helper driver means are operable to run in the WINDOWS Driver Model environment.

14. The apparatus of claim 12, wherein a role is determined according to a device type for which the multi-role driver means is invoked and the extent of the stack at the point at which the multi-role driver means is invoked.

15. A code arrangement on a machine-readable storage medium execution of which facilitates building in processor memory a stack of device objects (DOs) representing a device, there being a multi-role driver for a plurality of roles at least one of which corresponds to the device, the machine-readable code arrangement comprising:

a plurality of helper driver code portions;

a first code portion for registering the plurality of helper driver code portions so as to uniquely correspond to the plurality of roles, respectively, each helper driver code portion mapping uniquely to one of the multiple roles of the multi-role driver, respectively; and a second code portion for indirectly specifying a corresponding one of the multiple roles of the multi-role driver by specifying the helper driver code portion mapped thereto, wherein each of the multiple roles in the multi-role driver has a corresponding DOPush function, each DOPush function having been made available to be invoked by a code portion external to the multi-role driver.

16. The machine-readable code arrangement of claim 15, wherein the multi-role driver and the helper driver code portions are operable to run in the WINDOWS Driver Model environment.

17. The machine-readable code arrangement of claim 15, wherein a role is determined according to a device type for which the multi-role driver is invoked and the extent of the stack at the point at which the multi-role driver is invoked.

18. The machine-readable code arrangement of claim 15, wherein each helper driver code portion includes an AddDevice routine code portion that invokes a corresponding DOPush function in the multi-role driver, or each helper driver code portion points to the address of the corresponding DOPush function in the multi-role driver.

* * * * *